United States Patent [19]
Peterson

[11] 3,862,510
[45] Jan. 28, 1975

[54] FISHING LURE

[76] Inventor: Carmen A. Peterson, 38 Pilot Pl., New Port Richey, Fla. 33552

[22] Filed: July 9, 1973

[21] Appl. No.: 377,819

[52] U.S. Cl. .............................. 43/42.14, 43/42.2
[51] Int. Cl. .......................................... A01k 85/00
[58] Field of Search .............. 43/42.14, 42.19, 42.2, 43/42.11

[56] References Cited
UNITED STATES PATENTS

| | | | |
|---|---|---|---|
| 1,897,529 | 2/1933 | Palmer et al. | 43/42.14 X |
| 2,472,639 | 6/1949 | Wickens | 43/42.14 X |
| 2,585,494 | 2/1952 | Pelto | 43/42.14 |
| 2,617,226 | 11/1952 | Yoshii | 43/42.11 |

FOREIGN PATENTS OR APPLICATIONS

| | | | |
|---|---|---|---|
| 198,571 | 6/1923 | Great Britain | 43/42.2 |

Primary Examiner—Louis G. Mancene
Assistant Examiner—Daniel J. Leach
Attorney, Agent, or Firm—Stein and Orman

[57] ABSTRACT

A fishing lure comprising module means in the form of a plurality of module bodies movably mounted in concentric fashion relative to one another and rotationally mounted relative to a support element, in the form of an elongated member. The module means further comprises flexible disc members attached to each of the module bodies in outwardly, radially extending relation thereto where an engagement of the disc with the next adjacent module body causes a flexing of the disc and its forced configuration corresponding to the leading surface of the module body on which it is mounted. The module body is indented to at least partially enclose the next following body mounted adjacent thereto. The indentation in the body may be defined by a plurality of fins formed in spaced, radially extending fashion relative to the remainder of said body. Each of the module bodies may be made of material of varying specific gravity so as to control depth of travel in water and each may be made of varying colors to enhance its living qualities.

9 Claims, 6 Drawing Figures

PATENTED JAN 28 1975 3,862,510

FISHING LURE

BACKGROUND OF THE INVENTION

1. Field of the Invention

This invention relates to a fishing lure of the type primarily designed to be towed through water by a conventional fishing line and which includes a plurality of movable modules mounted on a support means wherein the modules are movable along the longitudinal axis of the support means and rotational relative thereto.

2. Description of the Prior Art

Various types of fishing lures, spoons and artificial bait have been utilized for many years for the purpose of catching fish by means of a fishing line of the conventional type apparatus. Devices of this type have taken many shapes and configurations in an attempt to provide an efficient "bait" which is attractive to the fish thereby increasing the chances of the fish being caught thereby. In the development of artificial bait, devices have taken various forms and have been specifically designed to emphasize or demonstrate the various specific factors which cause a fish to be attracted thereto. Prevalent among the most common of these factors is the configuration of the lure, the path it takes as it travels through water, and the depth at which the lure travels. To accomplish performance of the lure in the manner desired, specific structural features must be incorporated therein while at the same time allowing its configuration to demonstrate the proper effect such as reflection with specific movement. In addition, the lure must be relatively inexpensive to manufacture thereby reducing the initial cost of the lure to an acceptable amount considering that the user undergoes the frequent risk of loss of the lure. Keeping the initial cost in mind, the lure or artificial bait must also be made from a material capable of withstanding the generally harsh environment of salt water and also the force and weight applied thereto when actually engaged by a fish being caught.

One of the most desirable features found in successful or popular articifical bait is the provision of a number of moving parts which again is directed primarily to attracting the fish. Lures incorporating a plurality of moving parts are, of course, well known in the art. However, the problem of producing a popular lure which is effective for the attraction of fish while at the same time keeping its cost to a minimum and its durable life to a maximum has been an increasingly greater problem in the fishing industry. While it is well recognized that moving parts in an artificial bait are quite effective, the manufacture and operability or durability of lures of this type has become difficult to economically manufacture. In accomplishing all of the desirable features of artificial bait, of the various prior art devices which are known, have developed into relatively sophisticated, multimember devices. Various structural elements of these devices are designed to accomplish effects which have been set forth above. However, a number of these devices, because of their relative sophistication, are unnecessarily complex and therefore both overly priced and subject to rapid deterioration and frequent breakage.

It is therefore readily apparent that there is a need in the sport fishing industry for a lure capable of having the desirable characteristics including the structural configuration of a plurality of moving parts of variable coloration and capable of undulating and swimming motion, which serves to efficiently attract fish, while at the same time the design of such a lure structure including its movable parts should be economically feasible to manufacture and durable so as to last for a relatively prolonged period when subjected to adverse environment such as salt water and various stress placed when actually catching a fish.

SUMMARY OF THE INVENTION

This invention relates to a fishing lure of the type capable of being towed through water by conventional fishing apparatus. More specifically, the lure itself includes module means including a plurality of module means. Each module member comprising a module body each movably mounted on a module support member which may be an elongated rod, shaft, or stringer or the like. Each of the plurality of module bodies is concentrically mounted on the support member so as to move in both a rotational fashion relative to the support member and along its longitudinal axis. The longitudinal dimension of the support member is such as to allow the bodies to be arranged in spaced relation to one another when the lure is in a non-moving, substantially stationary or floating position. The module support means itself may be in the form of a leader wire, or a generally rigid elongated member not capable of flexing.

Each module member further comprising at least one substantially flexible disk mounted substantially adjacent to the leading portion of each module body and disposed in engagement with the rearward extremity, relative to the direction of travel of the lure itself, of the next forwardly adjacent module body. The inherent flexibility of the material from which the disk is formed allows the disk to be forced rearwardly into engagement with a substantially leading surface of the body on which it is mounted. This allows the disk to substantially conform to the configuration of the surface, in a substantially angular relation to the longitudinal axis of the support member on which the bodies are mounted. This position is automatically assumed when the lure is towed through water. The force of the water on each of the disks and bodies causes them all to be arranged in a substantially stacked array relative to one another. In this position, the rearward extremity of each module engages the front surface of the disk mounted on the following adjacent body thereby forcing it into engagement with the leading surface of that body as described above. Each of the bodies further comprises an indentation means specifically configured to at least partially enclose the leading portion, which may be termed as a nose, of the following adjacent module body. Accordingly, the stacked or "nested" array of the plurality of module bodies occurs due to the force of the water as the lure itself is being towed by conventional fishing equipment.

A module support base or like means is atached to the rearward extremity of the support means and is disposed to engage the rearmost module mounted on the support member.

A conventional hook or the like may be attached immediately adjacent and rearwardly of the module support base and it may be directly connected to the extremity of the support member in the means to be described hereinafter.

One embodiment of the present invention comprises each of the module bodies being substantially solid and having an indentation formed therein configured to at least partially enclose the leading nose of the next following adjacent module body. The indentation is formed by a "hollowed out" portion configured in the manner described.

A second embodiment of the present invention comprises the module body including a plurality of spaced apart radially disposed fins extending outwardly from the remainder of the body wherein the configuration and specific spaced disposition of the fins relative to one another also define this indentation means configured to at least partially enclose the leading portion of the next, following adjacent module body.

Regardless of the specific embodiment utilized, it is important to note that any or each of the module bodies may be made from a material having a different specific gravity. Such materials may be utilized wherein the ranges of specific gravities thereof are between substantially 5 to 2. Dependent on the specific gravity of the material, the depth of travel of the lure is determined. In addition, when a high specific gravity is used the ability to cast the lure is increased. Also, if the concentration of the weight is at the end of the lure the travel and casting ability will be affected to an even greater extent.

It will thus be seen that the objects made apparent from the preceding description are efficiently attained and, since certain changes may be made in the above articles without departing from the scope of the invention, it is intended that all matter contained in the above description or shown in the accompanying drawings shall be interpreted as illustrative and not in a limiting sense.

BRIEF DESCRIPTION OF THE DRAWINGS for a fuller understanding of the nature and objects of the invention, reference should be had to the following detailed description taken in connection with the accompanying drawing in which.

Similar reference characters refer to similar parts throughout the several views of the drawings.

DETAILED DESCRIPTION OF THE PREFERRED EMBODIMENT

Figure 1:
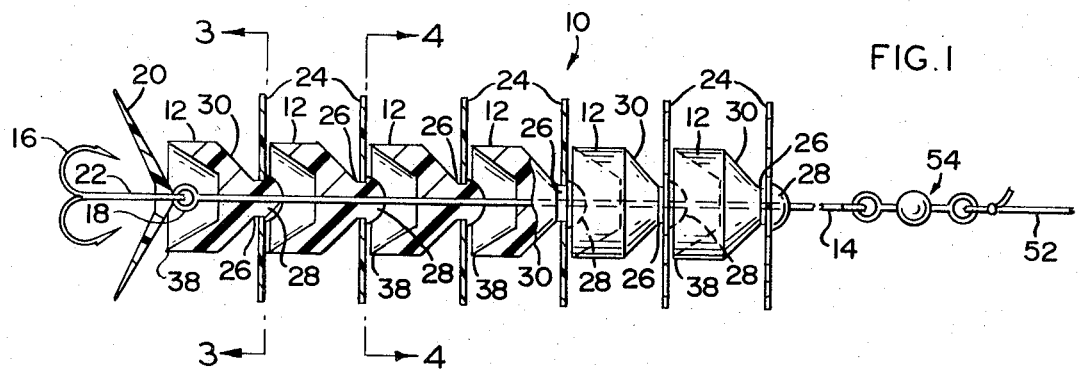
FIG. 1 is a partial sectional view showing the module means arranged in spaced apart fashion as when the lure is in substantially stationary position.
Figure 2:
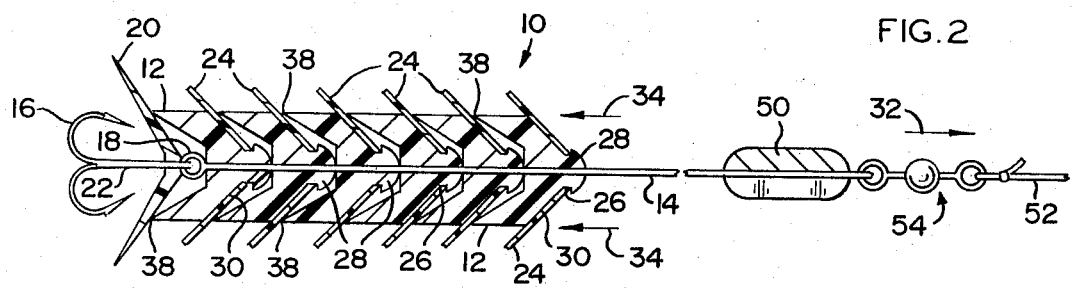
FIG. 2 is a partial sectional view wherein the modular bodies are arranged in stacked array due to the traveling of the lure in the direction indicated, through water.

The present invention relates to a fishing lure generally indicated in FIGS. 1 and 2 as 10. Module means in the form of a plurality member comprise a plurality of module bodies 12 movably mounted on module support means 14 which may be an elongated rod, wire or the like. This member 14 may be substantially rigid or may be of a fishing leader type construction and be relatively flexible to provide additional movement to the lure when utilized. Each of the module bodies is concentrically mounted about member 14 so as to be rotatable relative thereto and also to be capable of movement along the longitudinal axis thereof. A conventional hook means 16 is attached to the support means at the rear extremity thereof by means of an eyelet 18 which may be integrally formed to the elongated support member 14. A module support base 20 having a substantially circular configuration defined by a bevelled or angularly oriented disk relative to the longitudinal axis of the stem 22 is provided so as to engage the rearmost body 12 at its rear extremity thereof as shown in FIGS. 1 and 2.

Each module member further comprises a disk means 24 which may have a substantially circular configuration (see FIG. 3) and be made of a substantially flexible material. Each disk 24 is mounted on or connected to the front portion of each body 12 and concentric thereto and also to the longitudinal axis of support member 14. To facilitate this connection, a groove 26 is formed about the outer periphery of nose portion 28 of each body (see FIG. 6). The disposition of each disk 24 and the inherent flexibility of the material from which it is formed allow its conformance to the shape of leading surface 30 as clearly shown in FIG. 2. More particularly, as the lure assembly 10 passes through water in the direction indicated by arrow 32, the lures travel rearwardly along member 14 in the direction indicated by arrows 34. This causes the rear peripheral edge 38 of each body to engage the front surface of each disk member 24 relative to the direction of travel of the lure indicated by arrow 32. As the movement of each module body continues rearwardly, the disk 24 is forced into engagement with surface 30 of the body on which it is mounted. The flexibility allows its conformation to the substantial configuration of this surface as shown in FIG. 2 and the disk is arranged in substantially sandwiched relation between adjacently located bodies.

This stacked array is further provided by virtue of indentation means integrally formed in each body 12. This indentation means is formed by a hollowed out portion which allows the rear of each body 12 to substantially or partially surround the nose 28 of the following adjacent body, again as shown in FIG. 2.

Figure 3:
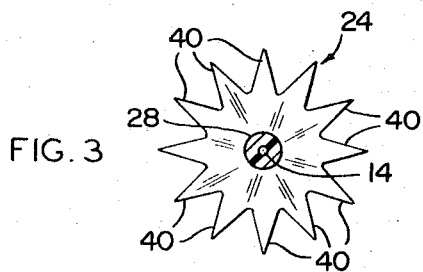
FIG. 3 is a sectional view taken through line 3—3 of FIG. 1.
Figure 4:
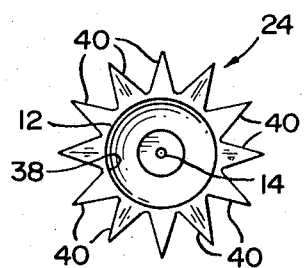
FIG. 4 is an end view taken along line 4—4 of FIG. 1.

FIGS. 3 and 4 show a structural configuration of the disk means 24 wherein its outer peripheral edge may comprise a plurality of integrally formed finger portions 40. This outer peripheral edge of disk 24 is not particularly limited to the configuration described and shown in FIGS. 3 and 4. However, the plurality of integrally formed fingers facilitates travel of the disk and lure assembly through water and also aids in the flexure of the disk as it is forced into the configuration shown in FIG. 2.

Figure 5:
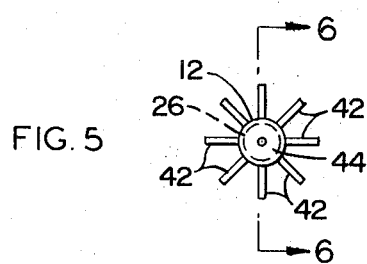
FIG. 5 is a front view of another embodiment of the present invention.
Figure 6:
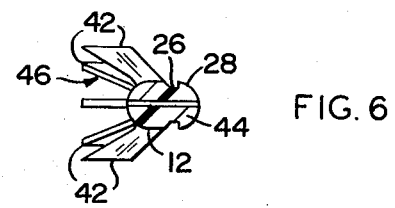
FIG. 6 is a sectional view taken along line 6—6 of FIG. 5.

Turning to FIGS. 5 and 6, a second embodiment of the module body 12 is shown comprising a plurality of fins 42 arranged in spaced relation to one another and integrally formed about the remainder 44 of body 12. The fins extend outwardly in a radially disposition from body portion 44 and are specifically arranged to define the indentation means generally indicated as 46 which allows each of the bodies 12 to at least partially encompass the nose portion 28 of the following adjacent module body.

In the embodiment shown in FIGS. 5 and 6, the specific configuration of fins 42 also aids in the flow of the assembly through water and will cause rotation of the body about member 14.

Referring to FIG. 2, a ballast means 50 may be added to the front portion of the support member 14 and the entire assembly may be attached to a conventional fishing line 52 by a swivel attachment 54 which is well known in prior art devices.

It will thus be seen that the objects made apparent from the preceeding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, is a matter of language, might be said to fall therebetween.

Now that the invention has been described, what is claimed is:

1. A fishing lure of the type capable of being towed through water, said lure comprising: support means, module means including a plurality of module members movably mounted on said support means in successively disposed relation to one another, said module members disposed in movable space relation to one another along at least a portion of the length of said support means, each of said module members comprising a module body, each of said module bodies movably mounted in substantially concentric relation to the longitudinal axis of said support means, each of said module members further comprising disk means mounted on each of said module bodies and extending radially outward therefrom, each of said disk means disposed on respective module bodies in cooperative engagement with relation to said module body positioned in adjacent relation thereto.

2. A fishing lure as in claim 1 wherein each of said disk means is formed from a substantially flexible material, whereby said disk is conformable to the configuration of an adjacent correspondingly positioned surface on said module body adjacent to said module body on which said disk means is mounted.

3. a fishing lure as in claim 2 wherein each of said module bodies is configured to engage said disk means mounted on at least one adjacent module body.

4. A fishing lure as in claim 1 wherein each of said module bodies is configured to engage said disk means mounted on at least one adjacent module body.

5. A fishing lure as in claim 1 wherein each of said module bodies comprises a substantially solid one-piece construction.

6. A fishing lure as in claim 1 wherein a plurality of said module bodies comprises a plurality of fins mounted on said body in a substantially circular configuration, said fins configured to at least partially surround at least one adjacent module body.

7. A fishing lure as in claim 1 wherein a plurality of said module bodies is rotationally mounted on said module support means, said plurality of module bodies each having a rear portion correspondingly configured relative to the fore portion of a next adjacent module body whereby said module bodies are movable into and out of a substantially stacked array.

8. A fishing lure as in claim 7 further comprising module base means mounted on said support means at one end thereof, said module base means disposed in supporting relation to said plurality of module bodies when in a stacked array.

9. A fishing lure as in claim 8 further comprising hook means mounted at one end of said module support means adjacent to said module base means.

* * * * *